United States Patent
Lee et al.

(10) Patent No.: US 7,616,151 B1
(45) Date of Patent: Nov. 10, 2009

(54) REDUCING SCATTERING CENTER DATA USING MAGNITUDE-BASED REDUCTION

(75) Inventors: Chul J. Lee, Lexington, MA (US);
Brian J. Harkins, Westford, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/138,711

(22) Filed: Jun. 13, 2008

(51) Int. Cl.
G01S 7/40 (2006.01)
G01S 13/00 (2006.01)
G06T 15/30 (2006.01)
G06T 17/20 (2006.01)
G06T 15/40 (2006.01)
H03F 1/26 (2006.01)
G06F 17/00 (2006.01)

(52) U.S. Cl. ............ 342/169; 342/175; 345/421; 345/423; 345/426; 707/101; 702/189

(58) Field of Classification Search ............. 342/169, 342/175, 195, 197; 345/421, 423, 426; 707/100, 707/101; 702/189–195
See application file for complete search history.

(56) References Cited

U.S. PATENT DOCUMENTS

| | | | |
|---|---|---|---|
| 4,123,165 A | | 10/1978 | Brown et al. |
| 4,373,808 A | | 2/1983 | Pell et al. |
| 5,086,396 A | | 2/1992 | Waruszewski, Jr. |
| 5,096,281 A | | 3/1992 | Windebank et al. |
| H1181 H | * | 5/1993 | Rihaczek ............. 342/25 F |
| 5,227,801 A | | 7/1993 | Pierce |
| 5,305,430 A | * | 4/1994 | Glassner ............. 345/427 |
| 5,317,689 A | | 5/1994 | Nack et al. |
| 5,355,442 A | | 10/1994 | Paglieroni et al. |
| 5,392,050 A | | 2/1995 | Guerci et al. |
| 5,583,975 A | * | 12/1996 | Naka et al. ............. 345/426 |
| 5,588,032 A | * | 12/1996 | Johnson et al. ............. 378/8 |
| 5,594,844 A | * | 1/1997 | Sakai et al. ............. 345/427 |
| 5,616,031 A | | 4/1997 | Logg |
| 5,933,146 A | * | 8/1999 | Wrigley ............. 345/420 |

(Continued)

OTHER PUBLICATIONS

Notification of Transmittal of the International Search Report and the Written Opinion of the International Searching Authority, or the Declaration, PCT/US2008/072433 dated Feb. 24, 2009.

(Continued)

Primary Examiner—Thomas H Tarcza
Assistant Examiner—Peter M Bythrow
(74) Attorney, Agent, or Firm—Daly, Crowley, Mofford & Durkee, LLP (57) ABSTRACT

A method to reduce scattering centers (SC) includes receiving a set of SC data points representing an object. The method also includes reducing SC data points associated with a first region based on magnitudes of intensity of the SC data points associated with the first region, reducing SC data points associated with a second region based on magnitudes of intensity of the SC data points associated with the second region, combining the reduced SC data points associated with the first region and the second region to form a reduced set of SC data points, comparing the reduced set of SC data points with the received set of SC data points to determine if the reduced set of SC data points meets a set of comparison metrics and if the reduced set of SC data points meets the set of comparison metrics, performing another iteration of the reducing.

21 Claims, 4 Drawing Sheets

U.S. PATENT DOCUMENTS

| | | | |
|---|---|---|---|
| 5,953,722 A * | 9/1999 | Lampert et al. | 707/100 |
| 6,005,916 A * | 12/1999 | Johnson et al. | 378/87 |
| 6,031,542 A | 2/2000 | Wittig | |
| 6,212,132 B1 | 4/2001 | Yamane et al. | |
| 6,750,805 B1 * | 6/2004 | Cameron | 342/90 |
| 6,750,859 B2 * | 6/2004 | Sowizral et al. | 345/418 |
| 6,924,763 B2 * | 8/2005 | Poullin | 342/159 |
| 6,941,303 B2 * | 9/2005 | Perrizo | 707/6 |
| 7,123,548 B1 | 10/2006 | Uzes | |
| 7,289,118 B2 | 10/2007 | Schmittler et al. | |
| 7,348,975 B2 | 3/2008 | Reshetov et al. | |
| 7,535,408 B2 * | 5/2009 | Kuhn | 342/129 |
| 2002/0060784 A1 | 5/2002 | Pack et al. | |
| 2002/0075260 A1 * | 6/2002 | Brokenshire et al. | 345/420 |
| 2002/0087858 A1 | 7/2002 | Oliver et al. | |
| 2003/0011519 A1 | 1/2003 | Breglia et al. | |
| 2003/0022395 A1 | 1/2003 | Olds | |
| 2005/0138073 A1 | 6/2005 | Zhou et al. | |
| 2008/0132174 A1 * | 6/2008 | Corral et al. | 455/67.16 |
| 2009/0040096 A1 | 2/2009 | Lee et al. | |
| 2009/0040098 A1 | 2/2009 | Lee et al. | |

OTHER PUBLICATIONS

Lozano L et al: "Improvements in Ray-Tracing Acceleration Techniques to Compute Diffraction Effect and Doubles and triples Effects in the RCS Prediction of Complex Targets", Antennas and Propagation Society Symposium, 2005. IEEE Washington, DC, Jul. 3-8, 2005, Piscataway, NJ: IEEE, US, vol. 3A, Jul. 3, 2005, pp. 93-96, XP010859931, ISBN: 978-0-7803-8883-3, the whole document.

Schmitz J L et al: "Zpatch. A high frequency bistatic signature prediction code", Radar Conference, 1997, IEEE National Syracuse, NY, USA May 13-15, 1997, New York, NY, USA, IEEE, US, May 13, 1997, pp. 232-236, XP010224774, ISBN: 978-0-7803-3731-2, the whole document.

Yu C L et al: "Radar cross section computation and visualization by shooting-and-bouncing ray (SBR) technique", Proceedings of the antennas and Propagation Society International Symposium (APSIS). Chicago, Jul. 20-24, 1992; [Proceedings of the Antennas and Propagation Society International Symposium (APSIS)], New York, IEEE, US, vol. -, Jul. 18, 1992, pp. 1323-1326, XP010065787, ISBN: 978-0-7803-0730-8, the whole document.

Savides T et al: "Radar simulation using the shooting and bouncing ray technique" CCECE 2003. Canadian Conference on Electrical and Computer Engineering, Montreal, Canada, May 4-7, 2003; [Canadian Conference on Electrical and Computer Engineering], New York, NY, IEEE, US, vol. 1, May 4, 2003, pp. 307-310, XP010653888, ISBN: 978-0-7803-7781-3, the whole document.

Ozturk A K: "Implementation of Physical Theory of Diffraction for Radar Cross Section Calculations", The Institute of Engineering and Sciences of Bilkent University, in Partial Fulfillment of the Requirements for the Degree of Master of Science, Jul. 2002, 72 pages.

Shore R A, Yaghjian A D: "Application of incremental length diffraction coefficients to calculate the pattern effects of the rim and surface cracks of a reflector antenna", Antennas and Propagation Society International Symposium, 1993, AP-S Digest, pp. 1350-1353.

C. Ozdemir, R. Bhalla, H. Ling, "Fast ASAR Imag Formation Using the Shooting and Bouncing Ray Technique", IEEE Antennas and Propagation Society International Symposium, vol. 4, pp. 2605-2608, Jul. 13-18, 1997.

T.B. Hansen, "Corner Diffraction Coefficients for the Quarter Plate", IEEE transactions on Antennas Propagation, vol. 39, No. 7, pp. 976-984, Jul. 1991.

R.A. Shore, A.D. Yaghjian, "Application of Incremental Length Diffraction Coefficients to Calculate the Pattern Effects of the Rim and Surface Cracks of a Reflector Antenna", IEEE Antennas and Propagation Society International Symposium, 1993.

Havran V: "Heuristic Ray Shooting Algorithms", PhD thesis, Czech Technical University in Prague, Nov. 2000, 220 pages.

Ufimtsev, P. Ya., "Diffraction of Plane Electromagnetic Waves By A Thin Cylindrical Conductor", Radio Eng. Electron Phys., vol. 7, pp. 241-249, 1962.

Pathak et al., "Model, Ray, and Beam Techniques for Analyzing the EM Scattering by Open-Ended Waveguide Cavities", IEEE Transaction on Antennas and Propagation, vol. 37, No. 5, May 1989, pp. 635-647.

Pathak et al., "An Efficient Hybrid FE-BI-TW-Collective Ray Formulation for Analysis of Large Conformal Arrays", 2008 Union Radio Scientifique Internationale—(URSI) General Assembly, Aug. 7-16, 2008, 4 pages.

Oguzer et al., "On the Elimination of Infinities in the PO Component of Equivalent Edge Currents", Wave Motion, vol. 18, pp. 1-10, 1993.

Prabhakar H. Pathak, "High-Frequency Techniques for Antenna Analysis", Proceedings of the IEEE, vol. 80, No. 1, Jan. 1992, pp. 44-65.

Book, Edited by Andrew S. Glassner, "An Introduction to Ray Tracing", U.S. Edition Published by Academic Press, 1989, 329 pages.

Steve Kosanovich, "Fundamentals of Xpatch", Training Class Manual, SAIC DEMACO, Apr. 28, 2008.

Antenna Handbook, vol. I Fundamentals and Mathematical Techniques; P.H. Pathak, Ohio State University ElectroScience Laboratory; Edited by Y.T. Lo and S.W. Lee; Chapter 4, pp. 4-1-4-110, Van Nostrand Reinhold, New York, 1993.

Notification of Transmittal of the International Search Report and the Written Opinion of the International Searching Authority, or the Declaration, PCT/US2008/072434 dated Feb. 6, 2009.

Walker et al., "Parallel Computation of Time-Domain Integral Equation Analyses of Electromagnetic Scattering and RCE", IEEE Transactions on Antennas and Propagation, IEEE Service Center, Piscataway, NJ, vol. 45., No. 4, Apr. 1, 1997, XP011002960, ISSN: 0018-926X, pp. 614-619.

Ngoly et al., "Parallel Post-Processing Techniques for Fast Radar Cross-Section Computation", 2006 $12^{th}$ Biennial IEEE Conf. on Electromagnetic Field Computation, Apr. 30, 2006, p. 377.

Jin-Lin Hu et al, "RCS Computation of Jet Engine with Complex Termination Based on Multiplaten Z-buffer Algorithm", Microwave Conf., 1999 Asia Pacific Singapore, Nov. 30-Dec. 3, 1999, Picscataway, NJ, USA, IEEE, Nov. 30, 1999, XP010374299, ISBN: 978-0-7803-5761-7, pp. 781-784.

Ling, H.; Chou, R.-C.; Lee, S.-W.; Shooting and bouncing rays: calculating the RCS of an Arbitrarily Shaped Cavity, Feb. 1989; Antennas and Propagation, IEEE Transactions on vol. 37, Issue 2, pp. (2): 194-205.

File downloaded from PAIR for U.S. Appl. No. 11/889,197, filed Aug. 9, 2007, file through Jun. 15, 2009, 67 pages.

File downloaded from PAIR for U.S. Appl. No. 11/889,198, filed Aug. 9, 2007, file through Jun. 15, 2009, 66 pages.

Real-time radar cross section of complex targets by physical optics graphical processing; Rius, J.M.; Ferrando, M.; Antennas and Propagation Society International Symposium, 1990, AP-S. Merging Technologies for the 90's'. Digest. May 7-11, 1990 pp. 1280-1283 vol. 3.

Xpatch 4: the next generation in high frequency electromagnetic modeling and simulation software; Andersh, D.; Moore, J.; Kosanovich, S.; Kapp, D.; Bhalla, R.; Kipp, R.; Courtney, T.: Nolan, A.; German, F.; Cook, J.; Hughes, J.; Radar Conference, 2000. The Record of the IEEE 2000 International.

3D scattering center extraction from Xpatch, Bhalla, R. Hao Ling, Dept. of Electr. & Comput. Eng., Texas Univ., Austin, TX; Antennas and Propagation Society International Symposium, 1995. AP-S. Digest, Jun. 18-23, 1995, vol. 4, On pp. 1906-1909 vol. 4, Jun. 18-23, 1995.

* cited by examiner

REDUCING SCATTERING CENTER DATA USING MAGNITUDE-BASED REDUCTION

BACKGROUND

A radar system emits radio waves that are reflected by an object (also referred to as a target) in a form of a reflect signal that is detected by the radar system. In general, the reflected signal includes a component associated with a direct reflection from the object (sometimes called a single bounce (SB)) and a component from indirect reflections from the object (e.g., reflections off of other objects in space such as ground, buildings and so forth) (sometimes called a multiple bounce (MB)). Based on the intensity and angle of the reflected signal, the location of the object may be determined.

In training scenarios, instead of using actual objects, it is more practical and cost effective to use simulated radar objects. The simulated radar objects may be generated using radar signature modeling tools that emulate the radar object. For example, radar signature modeling tools are used to generate radar signature models to emulate a variety of objects that include, for example, ballistic missiles, airplanes, other 3-Dimensional (3-D) objects and so forth. One such radar signature modeling tool is XPATCH®.

The radar signature modeling tools produce scattering center (SC) data associated with a radar object. The SC data includes Physical Optic (PO) SC data and Diffraction (DF) SC data. The PO SC data is associated with a surface of the radar object. The DF SC data is associated with the edges of the radar object. The SC data may be further categorized between single bounce (SB) and multiple bounce (MB). The SB SC data is associated with SC data indicative of a single bounce off of the object (direct reflection). The MB SC data is associated with SC data from multiple bounces (or indirect reflections) from the object.

SUMMARY

In one aspect, a method to reduce scattering centers (SC) includes receiving a set of data points representing an object. The object includes a first region and a second region. The method also includes reducing SC data points associated with the first region based on magnitudes of intensity of the SC data points associated with the first region, reducing SC data points associated with the second region based on magnitudes of intensity of the SC data points associated with the second region and combining the reduced SC data points associated with the first region and the second region to form a reduced set of SC data points. The method further includes comparing the reduced set of SC data points with the received set of SC data points to determine if the reduced set of SC data points meets a set of comparison metrics and if the reduced set of SC data points meets the set of comparison metrics, performing another iteration of reducing the SC data points by region based on the magnitudes of intensity of the SC data points for each region.

In another aspect, an article includes a machine-readable medium that stores executable instructions to reduce scattering centers (SC). The instructions cause a machine to receive a set of SC data points representing an object. The object includes a first region and a second region. The instruction also cause a machine to reduce SC data points associated with the first region based on magnitudes of intensity of the SC data points associated with the first region, reduce SC data points associated with the second region based on magnitudes of intensity of the SC data points associated with the second region and combine the reduced SC data points associated with the first region and the second region to form a reduced set of SC data points. The instructions further cause a machine to compare the reduced set of SC data points with the received set of SC data points to determine if the reduced set of SC data points meets a set of comparison metrics and if the reduced set of SC data points meets the set of comparison metrics, perform another iteration of reducing the SC data points by region based on the magnitudes of intensity of the SC data points for each region.

In a further aspect, an apparatus includes circuitry to receive a set of SC data points representing an object from a radar signature modeling tool. The object includes a first region and a second region. The apparatus also includes circuitry to reduce SC data points associated with the first region based on magnitudes of intensity of the SC data points associated with the first region, reduce SC data points associated with the second region based on magnitudes of intensity of the SC data points associated with the second region and combine the reduced SC data points associated with the first region and the second region to form a reduced set of SC data points. The apparatus further includes circuitry to compare the reduced set of SC data points with the received set of SC data points to determine if the reduced set of SC data points meets a set of comparison metrics and if the reduced set of SC data points meets the set of comparison metrics, perform another iteration of reducing the SC data points by region based on the magnitudes of intensity of the SC data points for each region.

In a still further aspect, a method to reduce scattering centers (SC) includes receiving a set of SC data points representing an object from a radar signature modeling tool, reducing SC data points associated with a first region based on magnitudes of intensity of the SC data points associated with the first region, reducing SC data points associated with a second region based on magnitudes of intensity of the SC data points associated with the second region and combining the reduced SC data points associated with the first region and the second region to form a reduced set of SC data points. The method further includes comparing the reduced set of SC data points with the received set of SC data points to determine if the reduced set of SC data points meets a set of comparison metrics including a similarity metric, a maximum amplitude metric, a length metric and a relative maximum amplitude metric, and if the reduced set of SC data points meets the set of comparison metrics, performing another iteration of reducing the SC data points by region based on the magnitudes of intensity of the SC data points for each region.

DETAILED DESCRIPTION

Prior attempts to reduce scattering centers (SC) for objects generated from 3D Inverse Synthetic Aperture Radar (ISAR) imageries were based on the magnitude of the SC data points for an entire object. For example, the SC data points having the stronger intensity (e.g., having the stronger radar cross section (RCS) value) were kept while the weaker intensity SC data points were discarded. As a consequence, often key features such as delay returns and/or low amplitude base returns were excluded from the SC data and thus the complexity of the object was lost. For example, after performing these prior art techniques, a missile did not appear like a missile after a SC data reduction. Moreover, current and near-future real-time radar return injection systems used in simulation do not have the processing capability to support a large number of SC data points generated by the radar signature modeling tools (e.g., XPATCH®). For example, to emulate an object, the radar signature modeling tools generated thousands of SC data points while the radar return injection systems can only effectively process a few hundred SC data points per object. Described herein are techniques to reduce the number of SC data points for an object provided by the radar signature modeling tools by roughly an order of magnitude smaller, for example, for use in current simulation applications while retaining the radar signature complexity of the object.

Figure 1:
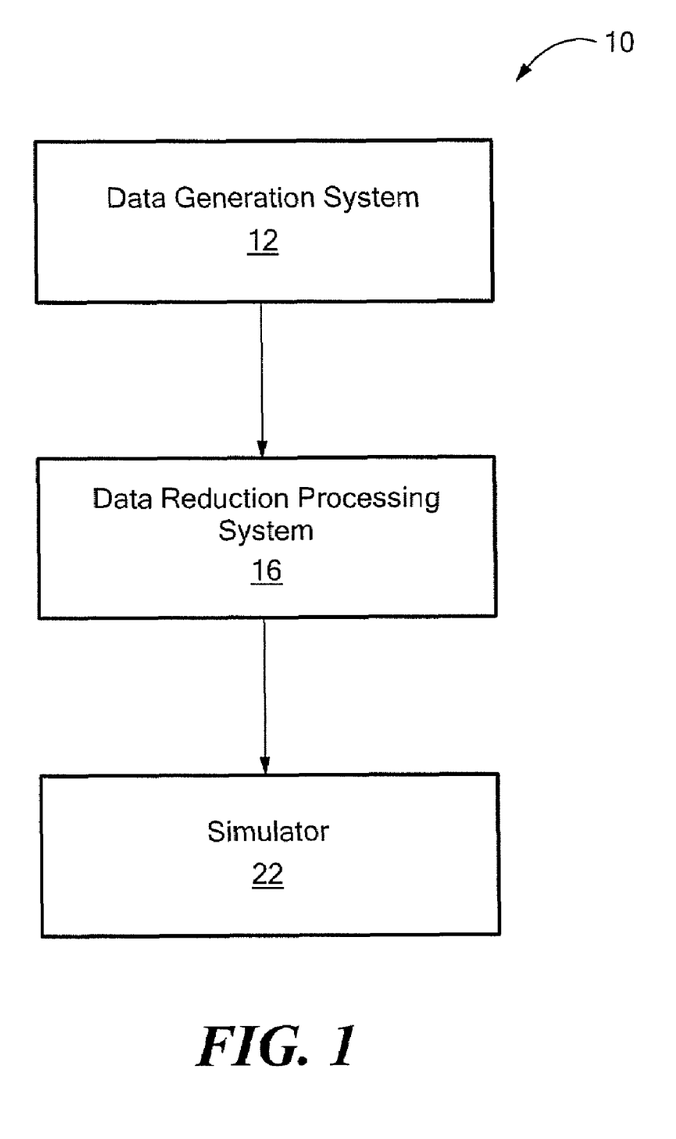
FIG. 1 is a diagram of a radar simulation system.

Referring to FIG. 1, a simulator system 10 includes a data generation system 12 such as a radar signature modeling tool, for example, a data reduction processing system 16 and a simulator 22. The data generation system 12 provides an original SC data set for a radar object. The data reduction processing system 16 reduces the original SC data set provided by the data generation system 12 and provides a reduced SC data set to the simulator 22 for radar simulations.

The data reduction processing system 16 identifies the components of an object and groups them into regions. For example, the SC data of a missile is compartmentalized into clustered regions by grouping together SC data based on components. The regions may include the nose of the missile, the body of the missile, the tail of the missile and so forth. In one example, a region may include one or more components. In one example, the number of regions is determined (e.g., by a user) depending on a size and shape of the object.

By segregating the object into smaller discrete regions, the data reduction processing system 16 ensures that the SC data from all of the regions of the object will be represented after the reduction and not just those regions having SC data with relatively higher intensity values (e.g. higher RCS values) than those of other regions of the object.

Within each region, the data reduction processing system 16 segregates the SC data into SC types. For example, the SC types include physical optic (PO) Single Bounce (SB), diffraction (DF) SB and PO multi-bounce (MB). SC data belonging to each SC type are separately reduced by region to form a reduced SC data set representing the SC type by region. In one example, reduction may include reducing the SC data by a percentage using the RCS values of each SC data point. For example, for each SC type by component, the data points having the lowest 10 percent RCS value are eliminated.

The reduced SC data sets representing their respective SC type and region are added together to form a reduced SC data set for the object. The reduced SC data set for the object is compared to the original SC data set received.

The data reduction processing system 16 performs the reduction of the SC data incrementally and checks the reduced SC data after each increment to determine as to whether the complexity of the object is being maintained.

In one particular example, the original SC data set provided by the data generation system 12 includes fields (e.g., flags) for each SC data point that include material identification (ID), component ID and bounce information (e.g., SB and MB). The material ID identifies the material and the component ID identifies the component associated with an SC data point.

In one example, the SC type may be determined based on one or more of the material identification (ID), the component ID and the bounce information. In particular, one or more of the material identification (ID), the component ID and the bounce information is compared with a SC determination table (e.g., a SC determination table 226) to determine the associated SC type.

In another example, other fields may be included in the original SC data set that identifies the SC type. The data reduction processing system 16 may use the fields to partition the original SC data set by region and to segregate the SC data set by SC type for each region.

Since a goal of reducing the number of SC data points is to maintain the complexity of the original SC data in the reduced SC data, the reduced SC data is compared against the original SC data at every reduction using a set of comparison metrics. If the differences between the original SC data and the reduced SC data are not outside pre-defined bounds defined by a set of comparison metrics, then the reduction process is executed again. The reduction cycle is repeated until a reduced SC data set that meets the comparison metrics is generated.

Figure 2:
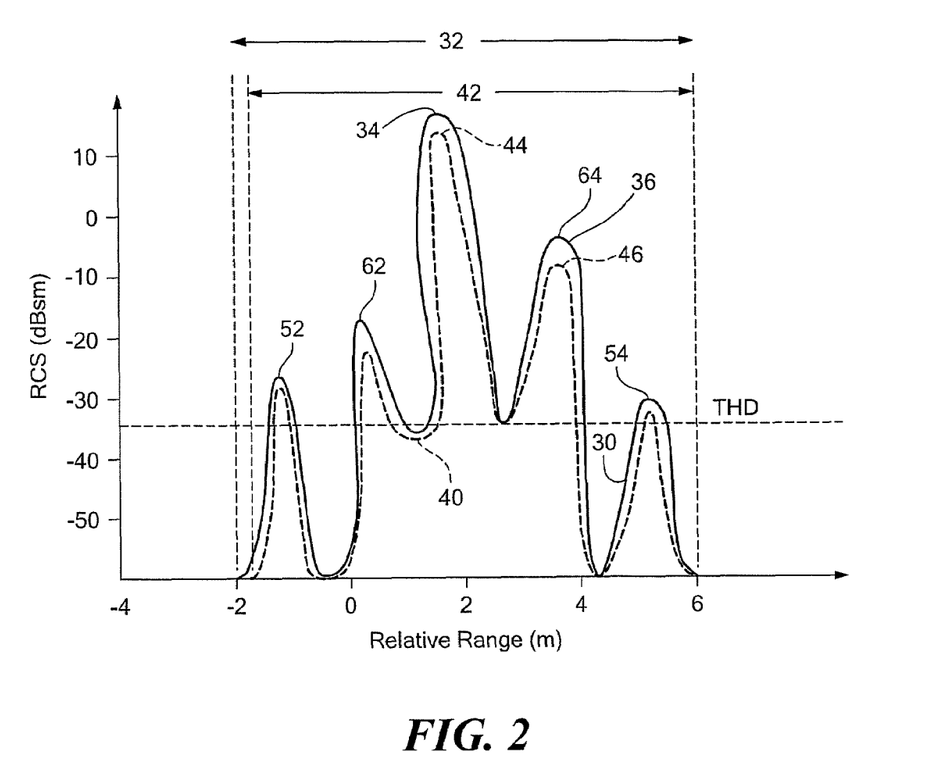
FIG. 2 is a graph depicting features used in comparing original scattering center (SC) data with reduced SC data.

Referring to FIG. 2, in one example, the comparison metrics are used to evaluate features of a radar return range profile from the reduced SC data compared to a radar return range profile from the original SC data. In particular, FIG. 2 illustrates representative wide-band (WB) range profiles (RCS values vs. relative range) for an original SC data set 30 and for a reduced SC data set 40.

In one example, the comparison metrics include a similarity metric, a length metric, a maximum amplitude metric and a relative maximum amplitude metric. The original SC data is compared to the reduced SC data for all SC data above a threshold intensity value to avoid corruption by secondary data.

The similarity metric is used to determine an acceptable similarity between the original SC data set and the reduced SC data set. The similarity is equal to $$1 - \frac{\left|\sum A_{ref}(>THD) - \sum A(>THD)\right|}{\sum A_{ref}(>THD) + \sum A(>THD)},$$

where A is the area (e.g., in meters squared) of the wide band profile of the reduced SC data, $A_{ref}$ is the area (e.g., in meters squared) of the wide band profile of the original SC data and THD is the threshold intensity value used to avoid corruption by secondary data. Similarity values range from 0 to 1 where 1 is the most similar. In one example, a similarity metric indicates that a similarity value above 0.6 is acceptable for object complexity.

The length metric is used to determine an acceptable length of the object in the reduced SC data. For example, in FIG. 2, a length is the length of the object that corresponds to the length of the pulse along the relative range axis. A length 32 corresponds to a length in the original SC data set and a length 42 corresponds to a length in the reduced SC data set. In one example, a length metric indicates that if the length 42 of the object in the profile for the reduced SC data set is within 80% of the length 32 of the object in the profile for the original SC data, then the length 42 is acceptable for object complexity. In another example, the length metric indicates that the difference in length between the length 42 and the length 32 is no greater than a predetermined length is acceptable for object complexity (e.g., if the object is a missile, the difference is 0.5 meters, for example).

The maximum amplitude metric is used to determine an acceptable maximum amplitude (maximum peak) in the reduced SC data. The maximum amplitude is the highest magnitude intensity of the WB pulse. For example, a maximum amplitude 34 is the highest magnitude of intensity (e.g., RCS value) for the original SC data set and a maximum amplitude 44 is the highest magnitude of intensity (e.g., RCS value) for the reduced SC data set. In one example, a maximum amplitude metric indicates that if the maximum amplitude 44 of the object in the profile for the reduced SC data set is within 2 dB of the maximum amplitude 34 of the object in the profile for the original SC data, then the maximum amplitude 34 is acceptable for object complexity.

The relative maximum amplitude metric is used to determine an acceptable relative maximum amplitude (relative maximum peak) in the reduced SC data. For example, in FIG. 2, an example of a relative maximum amplitude 34 is the highest magnitude of intensity (RCS) for the original SC data set and a maximum amplitude 44 is the highest magnitude of intensity (RCS) for the reduced SC data set. In one example, a relative maximum amplitude metric indicates that if the relative maximum amplitude 46 of the object in the profile for the reduced SC data set is within 2 dB of the maximum amplitude 36 of the object in the profile for the original SC data, then the relative maximum amplitude 34 is acceptable for object complexity.

In one example, the relative maximum amplitude metric comparison is performed at a first peak 52. In another example, the relative maximum amplitude metric comparison is performed at a last peak 54. In other examples, more than one relative maximum amplitude metric comparison may be performed for multiple relative maximum amplitudes (e.g., using any combination of the first peak 52, the last peak 54, and intermediary peaks (e.g. a peak 62 and a peak 64)).

Figure 3:
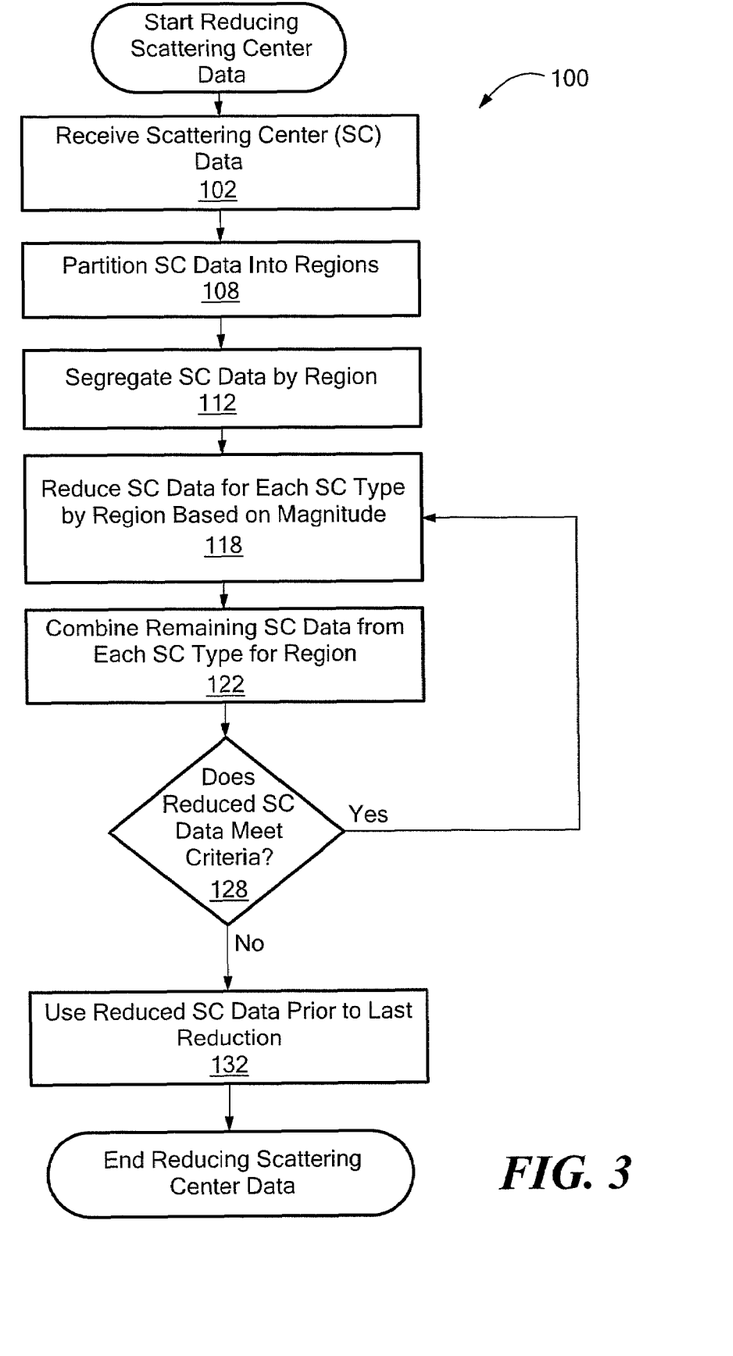
FIG. 3 is a flow chart of a process to reduce SC data.

Referring to FIG. 3, in one example, a process to reduce SC data is a process 100. The data reduction processing system 16 receives SC data associated with an object from the data generation system 12, for example (102). The data reduction processing system 16 partitions the SC data into regions (108). For example, the SC data is partitioned into regions of the object based on one or more component IDs. For example, if the object is a missile, the regions include a nose of the missile, a body of the missile and a tail of the missile. In one example, a missile includes nine regions.

The data reduction processing system 16 segregates the SC data by region into SC types (112). For example, if an object is a missile, the regions may be a tail, a body, a nose and so forth. In one example, the regions are determined by identifying fields in the SC data. The data reduction processing system 16 reduces the SC data by SC type and region (118). The data reduction processing system 16 combines the remaining SC data from each SC type for all regions to form a reduced SC data set (122). The data reduction processing system 16 determines if the reduced SC data meets the criteria (128). The reduced SC data is compared with the original SC data to determine if the reduced SC data meets a set of comparison metrics as described in FIG. 2, for example. If the reduced data meets the criteria, the data reduction processing system 16 starts another reduction cycle (118). If the reduced SC data does not meet the criteria, the data reduction processing system 16 uses the reduced SC data prior to the last reduction (132).

Figure 4:
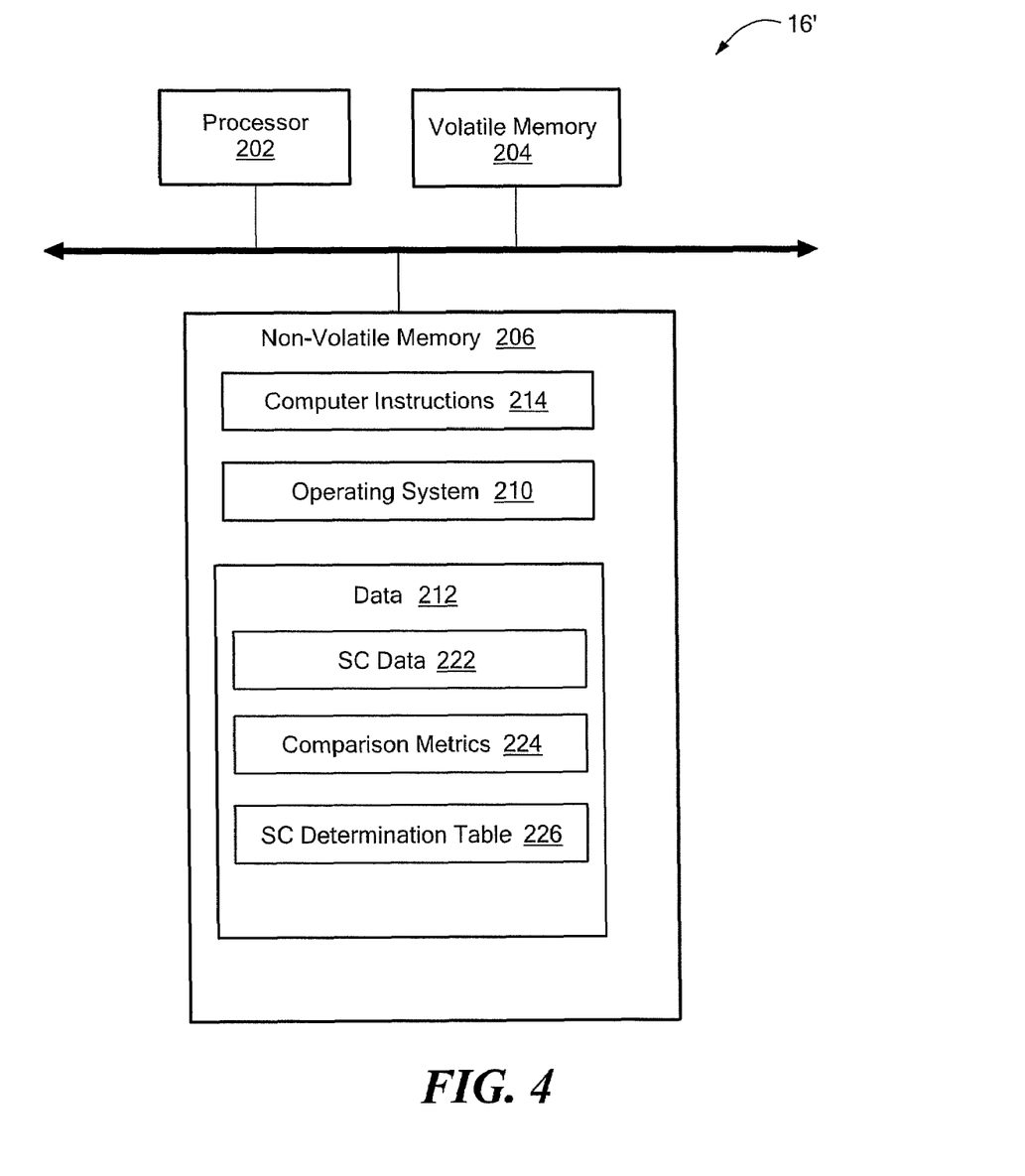
FIG. 4 is a block diagram of an example of a computer on which the process of FIG. 3 may be implemented.

Referring to FIG. 4, data reduction processing system 16 may be configured as a data reduction processing system 16', for example. The data reduction processing system 16' includes a processor 202, a volatile memory 204 and a non-volatile memory 206 (e.g., hard disk). The non-volatile memory 226 stores computer instructions 214, an operating system 210 and data 212 including SC data 222, comparison metrics 224, the SC determination Table. In one example, the computer instructions 214 are executed by the processor 202 out of volatile memory 204 to perform the process 100.

Process 100 is not limited to use with the hardware and software of FIG. 4; it may find applicability in any computing or processing environment and with any type of machine or set of machines that is capable of running a computer program. Process 100 may be implemented in hardware, software, or a combination of the two. Process 100 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform process 100 and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform process 100. Process 100 may also be implemented as a machine-readable storage medium, configured with a computer program, where upon execution, instructions in the computer program cause the computer to operate in accordance with process 100.

The processes described herein are not limited to the specific embodiments described. For example, the process 100 is not limited to the specific processing order of FIG. 3, respectively. Rather, any of the processing blocks of FIG. 3 may be re-ordered, combined or removed, performed in parallel or in serial, as necessary, to achieve the results set forth above.

The processing blocks in FIG. 3 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method to reduce scattering centers (SC) comprising:
   receiving a set of SC data points representing an object, the object comprising a first region and a second region;
   using a computer processor for:

reducing SC data points associated with the first region based on magnitudes of intensity of the SC data points associated with the first region;

reducing SC data points associated with the second region based on magnitudes of intensity of the SC data points associated with the second region;

combining the reduced SC data points associated with the first region and the second region to form a reduced set of SC data points;

comparing the reduced set of SC data points with the received set of SC data points to determine if the reduced set of SC data points meets a set of comparison metrics; and performing another iteration of reducing the SC data points by region based on the magnitudes of intensity of the SC data points for each region if the reduced set of SC data points meets the set of comparison metrics.

2. The method of claim 1, further comprising using the computer processor for:

segregating the SC data points associated with the first region by SC type; and segregating the SC data points associated with the second region by SC type, wherein the SC type comprises physical optic (PO) Single Bounce (SB), diffraction (DF) SB and PO multi-bounce (MB).

3. The method of claim 2 wherein reducing SC data points associated with the first region comprises reducing the SC data points associated with the first region by SC type, and wherein reducing SC data points associated with the second region comprises reducing the SC data points associated with the second region by SC type.

4. The method of claim 1 wherein comparing the reduced set of SC data points with the received set of SC data points based on a set of comparison metrics comprises comparing the reduced set of SC data points with the received set of SC data points based on a set of comparison metrics comprising at least one of:

a similarity metric;
a maximum amplitude metric;
a length metric; or
a relative maximum amplitude metric.

5. The method of claim 1, further comprising determining the first region and the second region by processing fields in the received SC data.

6. The method of claim 5, further comprising determining the SC types by processing fields in the received SC data.

7. The method of claim 1 wherein receiving a set of scattering center (SC) data points representing an object comprises receiving a set of scattering center (SC) data points from a radar signature modeling tool.

8. An article comprising a machine-readable medium that stores executable instructions to reduce scattering centers (SC), the instructions causing a machine to:

receive a set of SC data points representing an object, the object comprising a first region and a second region;

reduce SC data points associated with the first region based on magnitudes of intensity of the SC data points associated with the first region;

reduce SC data points associated with the second region based on magnitudes of intensity of the SC data points associated with the second region;

combine the reduced SC data points associated with the first region and the second region to form a reduced set of SC data points;

compare the reduced set of SC data points with the received set of SC data points to determine if the reduced set of SC data points meets a set of comparison metrics; and if the reduced set of SC data points meets the set of comparison metrics, perform another iteration of reducing the SC data points by region based on the magnitudes of intensity of the SC data points for each region.

9. The article of claim 8, further comprising instructions causing a machine to:

segregate the SC data points associated with the first region by SC type; and segregate the SC data points associated with the second region by SC type, wherein the SC type comprises physical optic (PO) Single Bounce (SB), diffraction (DF) SB and PO multi-bounce (MB).

10. The article of claim 9 wherein the instructions causing a machine to reduce SC data points associated with the first region comprises instructions causing a machine to reduce the SC data points associated with the first region by SC type, and wherein the instructions causing a machine to reduce SC data points associated with the second region comprises the instructions causing a machine to reduce the SC data points associated with the second region by SC type.

11. The article of claim 8 wherein the instructions causing a machine to compare the reduced set of SC data points with the received set of SC data points based on a set of comparison metrics comprises instructions causing a machine to comparing the reduced set of data points with the received set of SC data points based on a set of comparison metrics comprising at least two of:

a similarity metric;
a maximum amplitude metric;
a length metric; or
a relative maximum amplitude metric.

12. The article of claim 8, further comprising instructions causing a machine to:

determine the first region and the second region by processing fields in the received SC data; and determine the SC types by processing fields in the received SC data.

13. The article of claim 8 wherein the instructions causing a machine to receive a set of scattering center (SC) data points representing an object comprises instructions causing a machine to receive a set of scattering center (SC) data points from a radar signature modeling tool.

14. An apparatus comprising:
circuitry to:

receive a set of SC data points representing an object from a radar signature modeling tool, the object comprising a first region and a second region;

reduce SC data points associated with the first region based on magnitudes of intensity of the SC data points associated with the first region;

reduce SC data points associated with the second region based on magnitudes of intensity of the SC data points associated with the second region;

combine the reduced SC data points associated with the first region and the second region to form a reduced set of SC data points;

compare the reduced set of SC data points with the received set of SC data points to determine if the reduced set of SC data points meets a set of comparison metrics; and if the reduced set of SC data points meets the set of comparison metrics, perform another iteration of reducing the SC data points by region based on the magnitudes of intensity of the SC data points for each region.

15. The apparatus of claim 14 wherein the circuitry comprises at least one of a processor, a memory, programmable logic and logic gates.

16. The apparatus of claim 14, further comprising circuitry to:
   segregate the SC data points associated with the first region by SC type; and
   segregate the SC data points associated with the second region by SC type,
      wherein the SC type comprises physical optic (PO) Single Bounce (SB), diffraction (DF) SB and PO multi-bounce (MB)
      wherein the circuitry to reduce SC data points associated with the first region comprises circuitry to reduce the SC data points associated with the first region by SC type, and
      wherein the circuitry to reduce SC data points associated with the second region comprises the circuitry to reduce the SC data points associated with the second region by SC type.

17. The apparatus of claim 14 wherein the circuitry to compare the reduced set of SC data points with the received set of SC data points based on a set of comparison metrics comprises circuitry to compare the reduced set of SC data points with the received set of SC data points based on a set of comparison metrics comprising:
   a similarity metric;
   a maximum amplitude metric;
   a length metric; and
   a relative maximum amplitude metric.

18. The apparatus of claim 8, further comprising circuitry to:
   determine the first region and the second region by processing fields in the received SC data; and
   determine the SC types by processing fields in the received SC data.

19. A method to reduce scattering centers (SC) comprising:
using a computer for:
   receiving a set of SC data points representing an object from a radar signature modeling tool, the object comprising a first region and a second region;
   reducing SC data points associated with the first region based on magnitudes of intensity of the SC data points associated with the first region;
   reducing SC data points associated with the second region based on magnitudes of intensity of the SC data points associated with the second region;
   combining the reduced SC data points associated with the first region and the second region to form a reduced set of SC data points;
   comparing the reduced set of SC data points with the received set of SC data points to determine if the reduced set of SC data points meets a set of comparison metrics comprising:
   a similarity metric;
   a maximum amplitude metric;
   a length metric; and
   a relative maximum amplitude metric.
   performing another iteration of reducing the SC data points by region based on the magnitudes of intensity of the SC data points for each region if the reduced set of SC data points meets the set of comparison metrics.

20. The method of claim 19, further comprising:
using the computer for:
   segregating the SC data points associated with the first region by SC type; and
   segregating the SC data points associated with the second region by SC type,
      wherein the SC type comprises physical optic (PO) Single Bounce (SB), diffraction (DF) SB and PO multi-bounce (MB).
      wherein reducing SC data points associated with the first region comprises reducing the SC data points associated with the first region by SC type, and
      wherein reducing SC data points associated with the second region comprises reducing the SC data points associated with the second region by SC type.

21. The method of claim 20, further comprising:
determining the first region and the second region by processing fields in the received SC data; and
determining the SC types by processing fields in the received SC data.

* * * * *

UNITED STATES PATENT AND TRADEMARK OFFICE
CERTIFICATE OF CORRECTION

| | | |
|---|---|---|
| PATENT NO. | : 7,616,151 B1 | Page 1 of 1 |
| APPLICATION NO. | : 12/138711 | |
| DATED | : November 10, 2009 | |
| INVENTOR(S) | : Lee et al. | |

It is certified that error appears in the above-identified patent and that said Letters Patent is hereby corrected as shown below:

Col. 1, line 40, delete "of data points" and replace with -- of SC data points --.

Col. 1, line 61, delete "instruction" and replace with -- instructions --.

Col. 3, line 50, delete "value" and replace with -- values --.

Col. 3, line 61, delete "include" and replace with -- includes --.

Col. 8, line 29-30, delete "comparing" and replace with -- compare --.

Col. 9, line 15, delete "(MB)" and replace with -- (MB), --.

Col. 10, line 30, delete "(MB)." and replace with -- (MB), --.

Col. 10, line 43, delete "metric." and replace with -- metric, --.

Signed and Sealed this

Fifth Day of January, 2010

David J. Kappos
*Director of the United States Patent and Trademark Office*